United States Patent [19]

Kreidl

[11] Patent Number: 5,649,124
[45] Date of Patent: Jul. 15, 1997

[54] HIGH-SPEED BUS SYSTEM FOR SIMULTANEOUS SERIAL AND PARALLEL DATA TRANSFER AND A METHOD OF OPERATING THE SYSTEM

[75] Inventor: Josef Kreidl, Kaufbeuren, Germany

[73] Assignee: PEP Modular Computers AG, Zug, Switzerland

[21] Appl. No.: 190,007

[22] PCT Filed: Jul. 22, 1992

[86] PCT No.: PCT/EP92/01662

§ 371 Date: Jun. 17, 1994

§ 102(e) Date: Jun. 17, 1994

[87] PCT Pub. No.: WO93/03440

PCT Pub. Date: Feb. 18, 1993

[30] Foreign Application Priority Data

Jul. 30, 1991 [DE] Germany .................... 41 25 219.5

[51] Int. Cl.$^6$ .................................................. G06F 13/00
[52] U.S. Cl. .................................... 395/306; 395/891
[58] Field of Search ........................ 395/891, 306, 395/308, 550, 309

[56] References Cited

U.S. PATENT DOCUMENTS

| 4,570,220 | 2/1986 | Tetrick et al. ................ 395/325 |
| 4,577,317 | 3/1986 | Chu et al. ..................... 370/110.1 |
| 4,641,263 | 2/1987 | Perlman et al. ................ 395/891 X |
| 4,688,171 | 8/1987 | Selim et al. .................. 395/200 |
| 5,134,702 | 7/1992 | Charych et al. ............... 395/500 |

FOREIGN PATENT DOCUMENTS

| 0228124A1 | 7/1987 | European Pat. Off. ........ G06F 13/40 |
| 0270896A3 | 6/1988 | European Pat. Off. ........ G06F 13/12 |

*Primary Examiner*—Jack B. Harvey
*Assistant Examiner*—Glenn A. Auve
*Attorney, Agent, or Firm*—Robert B. Hughes; Hughes, Multer & Schacht

[57] ABSTRACT

A high-speed bus system which combines at least one parallel bus and at least one serial bus for simultaneous parallel and serial data transfer with serial data transfer taking place after connection setup at the same time as normal transfer of data and/or programs takes place on the parallel bus. Connection setup for both parallel and serial data transfer uses the logic circuit of the parallel bus. The particular adaptability of the high speed bus system is also achieved by using a high speed serial/parallel and parallel/serial converter which is connected between a parallel bus and a serial bus. This high speed serial/parallel and parallel/serial converter contains two functional units, one functional unit contains a no-delay start/stop oscillator and the other functional unit contains an internal control logic circuit which generates a busy signal when the serial bus is occupied. The start/stop oscillator is built around a delay line and a gate and has a no-delay response in the gigahertz range, thus making it possible to achieve an extremely high data transfer rate.

21 Claims, 4 Drawing Sheets

HIGH-SPEED BUS SYSTEM FOR SIMULTANEOUS SERIAL AND PARALLEL DATA TRANSFER AND A METHOD OF OPERATING THE SYSTEM

BACKGROUND OF THE INVENTION a) Field of the Invention

The invention concerns a high-speed bus system and a method of operating the high-speed bus system using at least one parallel bus and at least one serial bus. Various types of bus system are known, including bus systems that have already been standardized such as the VMEbus, which conveniently has two idle lines which are not used for connection setup or for parallel data transfer (SERDAT and SERCLK).

b) Background Art

The standard parallel VMEbus is described in the publication entitled "The VMEbus Specification" in accordance with ANSI/IEEE STD1014-1987, IEC821 and 297 of the VMEbus International Trade Association, 10229 N. Scottsdale Road, Suite E, Scottsdale, Ariz. 85253, U.S.A., (602) 951-8866.

So-called "message passing" in parallel bus systems is a known method of implementing fast data transfer. However, this known method has serious drawbacks because the parallel bus is occupied during the time required for data transfer and this known method is considerably expensive in terms of hardware.

The task which the invention aims to solve is to create a high-speed bus system which allows a significant increase in the speed of data transfer, in particularly even where conventional bus systems are used, and which can be adapted to suit extremely different data transfer conditions. In addition, the invention is also intended to provide a method of operating such a high-speed bus system.

SUMMARY OF THE INVENTION

In order to solve this task, the present invention provides a high-speed bus system in which at least one parallel bus and at least one serial bus are combined for simultaneous parallel and serial data transfer with serial data transfer taking place after connection setup at the same time as normal transfer of data and/or programs takes place on the parallel bus and where connection setup for both parallel and serial data transfer takes place using the logic circuitry of the parallel bus.

The high-speed bus system according to this invention can, in particular, also be implemented fully in existing and/or standardized bus systems and ideally the parallel bus consists of a standard VMEbus, a standard Futurebus or a so-called Multibus II (a parallel system bus which consists of sixty four lines, each of which has a defined use, this being capable of having one or more of lines being converted to serial data transfer) and at least one of the lines of these standard buses that are not normally used forms a high-speed serial bus. In other words, according to the invention, the idle lines in these standard buses are used as high-speed serial buses. If such a bus system does not have any "idle lines" (lines that are not used for connection setup or for data transfer), these can be created simply as an add-on link.

The invention can also be advantageously arranged so that in the event of block transfer in accordance with a protocol, the parallel data transferred during connection setup contains all the necessary information for serial transfer such as the start address, block length etc. with block transfer taking place exclusively via the serial bus.

Particularly where several bus systems of several subscribers are used or connected together, a high-speed serial/parallel and parallel/serial converter can be inserted between a parallel bus and a serial bus.

This high-speed serial/parallel and parallel/serial converter according to the invention has two functional units; one functional unit consists of a prescaler, a voltage-controlled oscillator and a phase-locked loop and the other functional unit contains an internal control logic circuit which, among other things, generates a busy signal (BUSY) when the serial bus is occupied.

With the high-speed bus system according to this invention, if several subscribers are combined for a data exchange, each of the subscribers can conveniently be equipped with such a high-speed serial/parallel and parallel/serial converter. The internal control logic circuit in each of these converters is designed so that if the serial bus is occupied, a busy signal (BUSY) is generated so that it is obviously apparent whether or not it is permissible to start local connection setup for serial data transfer.

High-speed conversion in the converter mentioned above is also enhanced by the fact that the received data from one functional unit can be transmitted as synchronization data to synchronize the phase-locked loop and the voltage-controlled oscillator in the other functional unit.

The invention also relates to a method of operating a high-speed bus system using at least one parallel bus and at least one serial bus.

The method according to the invention is characterised by the fact that during a connection setup for a single transfer (data word) under an associated address via the serial bus, after selecting an addressed module and after transferring a memory address, an enabling signal (DTACK) is generated by the module in question to immediately enable the parallel bus in order, during serial data transfer, to make the parallel bus ready for an independent parallel transfer of data which takes place at the same time.

The present invention therefore has the advantage of using the existing method of data transfer for connection setup but using transfer which takes place at the same time as normal data transfer on the parallel bus for transfer itself. While serial transfer is taking place after connection setup, normal transfer of data and/or programs can take place on the parallel bus. This increases the throughput of the entire system cumulatively by adding both parallel and serial transfer. Using the existing logic circuit of the parallel bus for connection setup in both parallel and serial data transfer means that only relatively little additional logic circuitry is needed to control high-speed serial transfer. For this reason, with the high-speed bus system according to this invention, it is possible to mix modules with a serial and parallel transfer capability with modules having only a parallel transfer capability.

One of the particularly advantageous embodiments that can be obtained in practice is the fact that the high-speed serial/parallel and parallel/serial converter has two functional units of which one functional unit contains a no-delay response start/stop oscillator and the other functional unit contains an internal control logic circuit that generates a busy signal when the serial bus is occupied.

In practice, the start/stop oscillator can be implemented using very few components and comprises, for example, a controllable gate and a delay line, one terminal of which is connected to the output of the gate and the other terminal of which is connected to a first input of the gate with the gate receiving a control signal on at least a second input terminal. When a control signal is applied to this second input terminal, the above mentioned gate switches on and the voltage jump which occurs on the output of the gate is propagated via the delay line and received at the first input of the gate after a preset delay thereby switching off the gate. The voltage drop which occurs on the output of the gate is in turn propagated with an appropriate delay through the delay line to the first input of the gate, thus switching the latter on again and so on in order to generate a pulse train on the output of the gate which can be switched on without any delay and switched off again without any delay.

The method of operation of the start/stop oscillator explained above can be implemented, for instance, if the first input terminal of the AND gate connected to the other terminal of the delay line is a negating input and at least a second input terminal is a normally non-inverting input.

The pulse-repetition frequency that can be obtained using this start/stop oscillator depends essentially on the possible switching speed of the gate used.

Using the start/stop oscillator, synchronization of a receiving terminal with a sending terminal can conveniently be obtained, for example, by adding synchronizing bits to the data flow to be transferred so that, for example, a synchronizing pulse or synchronizing bit is inserted after one byte has been transferred.

The delay line of the start/stop oscillator can conveniently be formed as striplines on a printed circuit board with the striplines in question being arranged in a looping pattern to achieve temperature compensation.

In order to acquire the above mentioned control signal for the start/stop oscillator from the synchronizing bits, there is also a signal conditioning circuit which generates a control signal, from a single synchronizing pulse, of which the time characteristic starts, for instance, with the leading edge of the synchronizing pulse and ends shortly after the end of the transfer of a byte so that the start/stop oscillator is restarted with each new synchronizing bit which occurs.

The start/stop oscillator can also be designed so that the pulse repetition frequency generated by it is in the gigahertz range, for example 1.8 GHz.

One further particularly advantageous embodiment of the invention involves implementing a device to measure the synchronizing pulse train which measures the pulse repetition frequency of the synchronizing pulses or synchronizing bits using the oscillator pulses from the start/stop oscillator and adjusts the shift-clock frequency automatically depending on the measurement result.

This latter device can also be operated so that the clock frequency of the signal or data sequence to be sent can be selected in specific steps.

In order to achieve this, the device that measures the synchronizing pulse repetition frequency consists of several controllable dividing stages of which the division ratio can automatically be set to the repetition frequency of the received signal in receive mode and can be set selectively to a desired output frequency in send mode.

The invention is explained in further detail below taking typical embodiments, reference being made to the following drawings which show:

DESCRIPTION OF THE PREFERRED EMBODIMENTS

Figure 1:
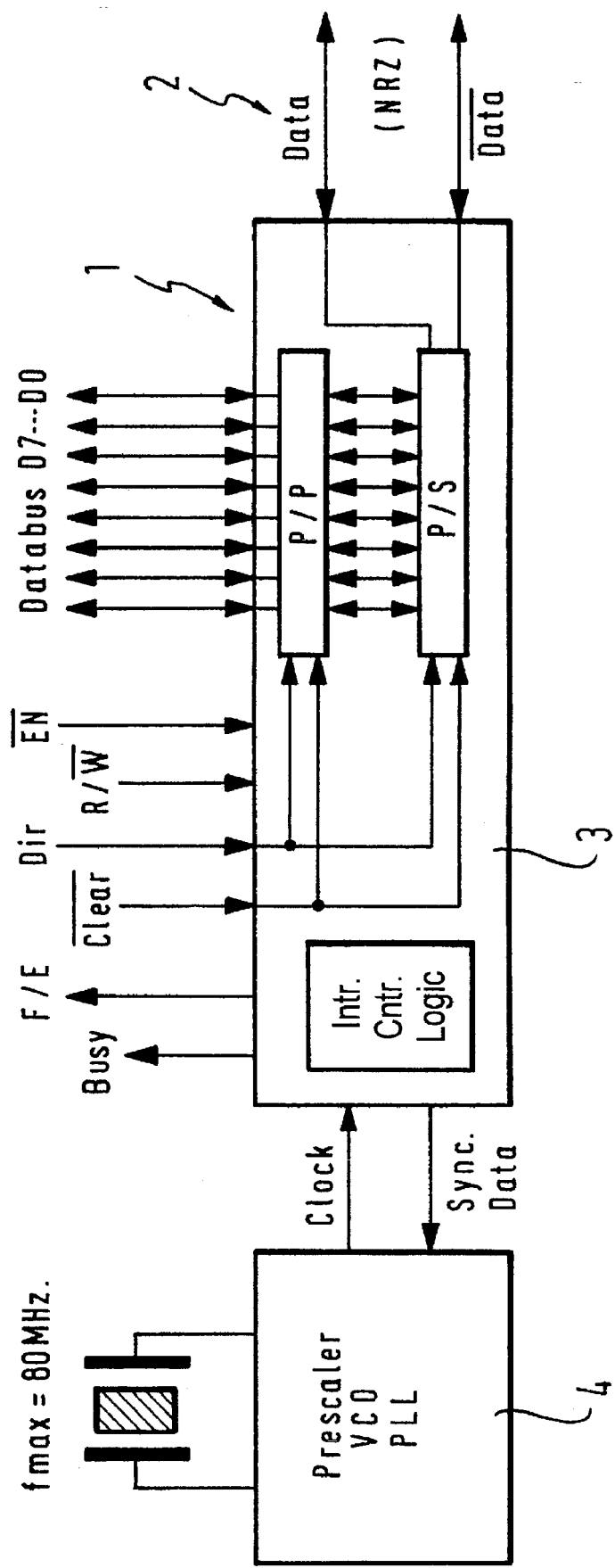
FIG. 1. Block diagram of a high-speed serial/parallel and parallel/serial converter.

In FIG. 1, the high-speed serial/parallel and parallel/serial converter is generally denoted as 1 and consists of two functional units 3 and 4, functional unit 4 consists of a prescaler, a voltage-controlled oscillator (VCO) and a phase-locked loop (PLL). In addition to an internal control logic circuit, the other functional unit 3 contains an intermediate register P/P which accepts data or data bytes supplied via parallel bus D7 . . . D0 with this intermediate register P/P being a FIFO in order to ensure a continuous transfer capability. In the illustrated typical embodiment, the parallel bus can be 8 bits wide (D0–D7) for instance and may also be extended to any word width. The data is loaded in a shift register P/S from intermediate register P/P mentioned above and is output from P/S to serial bus 2 at the clock frequency.

The two functional units 3 and 4 are also connected to each other via a clock line with the clock line being used to deliver the shift clock for serial sending or receiving. In the typical embodiment illustrated, there is the following relationship between the crystal frequency used and the clock signal (clock):

$$f_{clock} = n \times f_{max} \text{ (crystal)},$$

where n is 40 in this example. This gives the following:
Crystal frequency: 80 MHz 40 MHz
Shift-clock frequency: 3.2 GHz 1.6 GHz The received data is routed via Sync Data to the PLL and VCO and is used to generate a synchronous 1:1 clock.

The converter shown also offers the facility to freely select the data width of the parallel interface which is to be transmitted serially with the frequency of the parallel data sequence also being user selectable.

The illustrated converter can be operated in both directions either from the parallel bus to serial bus 2 or from the serial bus to the parallel bus with the data path explained in the latter case simply being used in the opposite direction.

With this latter transfer direction, the data direction is specified to the converter via DIR for the entire duration of transfer, i.e. this makes the definition as receiver or sender.

$\overline{\text{EN}}$ and R/$\overline{\text{W}}$ can be used to write or read intermediate register P/P. Signal F/E indicates whether register P/P contains data and thus allows continuous serial data transfer in both directions.

Clear is used to reset the register and control logic circuit to their initial state.

The "BUSY" signal mentioned earlier indicates that serial transfer is in progress and thus allows TIMEOUT supervision of all serial drivers.

This allows each module to detect whether or not it can actively initiate connection setup for a serial data transfer.

High-speed serial/parallel and parallel/serial converter 1 can be expanded extensively given current semiconductor technology and all the functions including that of the VCO and PLL can be integrated in one MIC component.

The signals generated or received by illustrated converter 1 are as follows:

| | |
|---|---|
| DATA | Serial data, non-inverted |
| DATA̅ | Serial data, inverted |
| | The data must be bidirectional in order to ensure the send and receive function (NRZ) |
| E̅N̅ | Same function as Chip Select signal in a microprocessor system |
| R/W̅ | Write/read signal for data transfer |
| DIR | Defines the direction of the serial data stream |
| CLEAR̅ | A logical zero on this pin clears all registers (reset) asynchronously |
| F/E | Indicates that the receive register is full or the transmit register is empty |
| BUSY | Indication that data is being transferred on the serial bus |
| CLOCK | Clock signal for internal logic circuit and for generation of serial data stream. A positive clock pulse produces one serial data bit. Maximum clock frequency: 3.2 GHz Operating range: 1.6 or 3.2 GHz |
| SYNC DATA | Output data for the PLL section for synchronization with the clock signal (primarily during receive phase) |

In the method according to the invention of operating a high-speed bus system, at least one parallel bus and at least one serial bus are combined with each other and the method can, for example, be carried out so that during connection setup, as described, for instance, on pages 74 and 75 of the publication mentioned in the introduction, with a single transfer or transfer of a data word under an associated address via the serial bus, after selecting an addressed module and after transferring a memory address, an enabling signal (DTACK signal) is generated by the addressed module in order to immediately enable the parallel bus so that, during serial data transfer, the parallel bus is made ready for independent parallel transfer of data that takes place at the same time.

Figure 2:
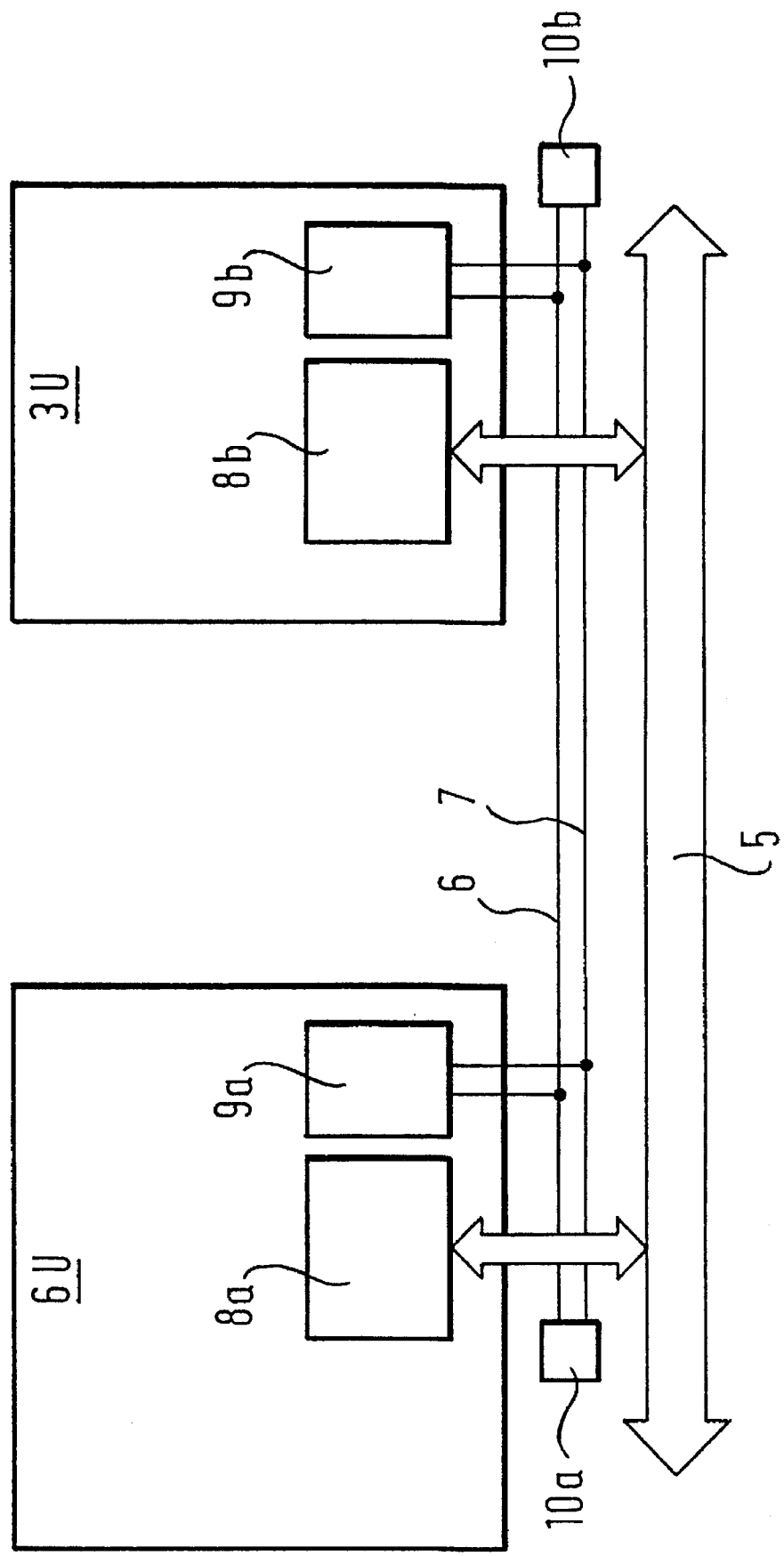
FIG. 2. Block diagram of a typical embodiment with two terminals that communicate with each other.

FIG. 2 shows a typical embodiment of two terminals 6U and 3U that communicate with each other that are connected via a parallel bus system 5 (e.g. VMEbus) and a serial bus system with two lines 6 and 7.

Figure 3:
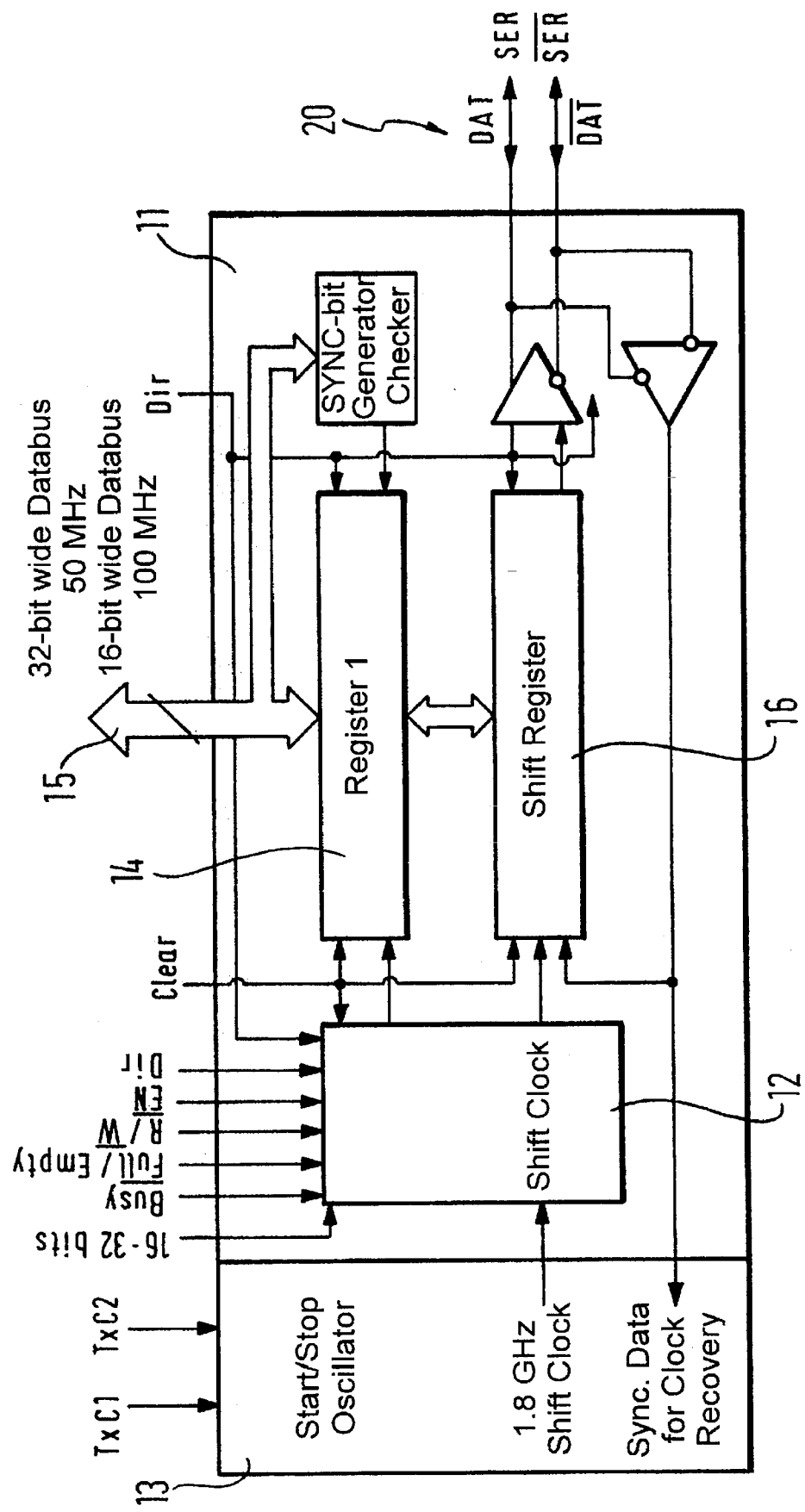
FIG. 3. A further embodiment of a high-speed serial/parallel and parallel/serial converter in block diagram form.

8a and 8b respectively denote a VMEbus master/slave interface via which connection setup between the two terminals 6U and 3U is obtained using parallel bus system 5. 9a and 9b respectively denote a module (called the "highway interface") that represents the circuit layout in FIG. 3 for example.

10a and 10b respectively denote line terminations.

When a communication connection is established between terminal 6U and 3U, the initiating connection setup is established via stages 8a and 8b using VMEbus 5 where, after completing call setup, both bus systems referenced by symbols 5, 6 and 7 can be used to transfer data. Data is transferred in serial form on lines 6 and 7 whereas data is transferred in parallel form on VMEbus 5.

FIG. 3 shows a further typical embodiment of a high-speed serial/parallel and parallel/serial converter according to this invention. This converter consists, in principle, of two functional units 11 and 13 where one functional unit 13 contains a no-delay start/stop oscillator and the other functional units 11 contains internal control logic circuit 12 which generates a busy signal (BUSY) when serial bus 20 is occupied.

Functional unit 11 contains register 1 which is connected to a 32-bit wide data bus (50 MHz) or a 16-bit wide data bus (100 MHz). Register 1 is connected to a shift register 16 which outputs data in serial form on bus 20 in send mode and receives serial data via bus 20 in receive mode.

Register 1 and shift register 16 are controlled by internal control logic circuit 12.

Figure 4:
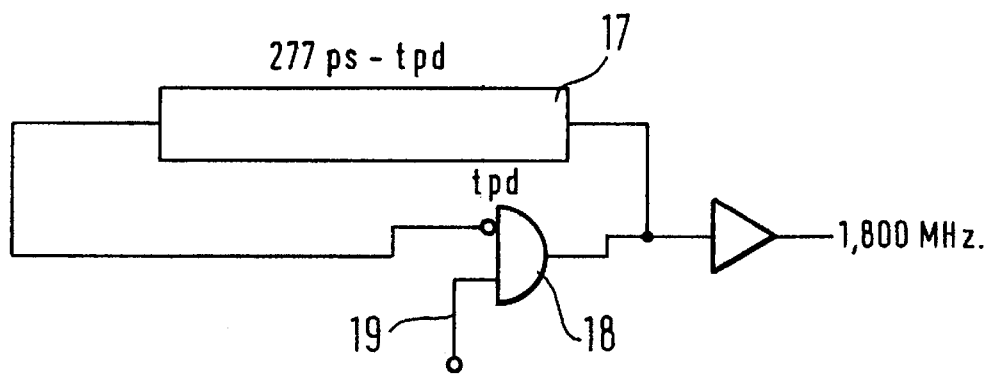
FIG. 4. A typical embodiment of a start/stop oscillator.

The other functional unit 13 contains a start/stop oscillator of which the structure is shown in FIG. 4. The start/stop oscillator in FIG. 4 includes a delay line 17 which, in practice, can conveniently consist of a printed conductor or stripline on a printed circuit board with this stripline conveniently being arranged in a looping pattern in order to compensate for changes in propagation times due to temperature.

The input terminal of delay line 17 is connected to the output of AND gate 18 and the output terminal of delay line 17 is connected to a negating input of AND gate 18. Gate 18 also has a normal control input 19 to which a control signal is applied. The control signal is obtained using the signal conditioning circuit contained in functional unit 13 (not illustrated) from the synchronizing bits that are inserted at the end of each byte in the serial data flow.

The time characteristic of control signal St (see FIG. 5) is selected so that the control signal starts, for example, on the leading edge of a synchronizing pulse or synchronizing bit and ends shortly after the end of transfer of a byte (i.e. after 8 shift-clock pulses for instance).

Because the start/stop oscillator in FIG. 4 operates without any delay or settling time, synchronization can always take place after the transfer of a byte.

The signal frequency generated using the start/stop oscillator is in the gigahertz range in the embodiment shown, for example 1800 MHz.

Figure 5:
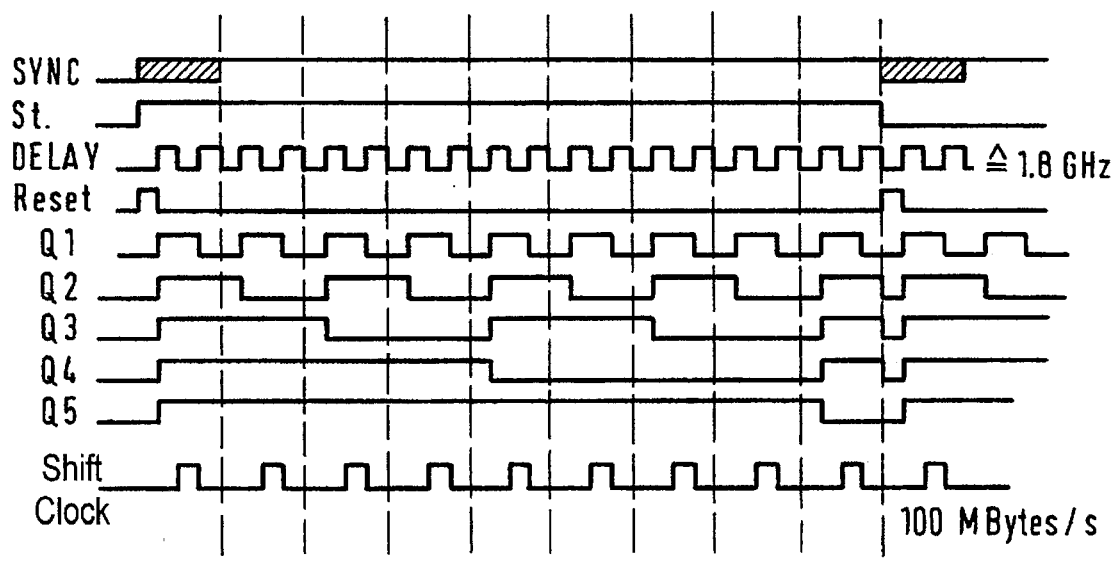
FIG. 5. Signal waveforms that can occur or be generated in the case of the block diagram in FIG. 3.

FIG. 5 shows various signal waveforms which each occur with the circuit layout in FIG. 2.

The first line in FIG. 5 shows two successive synchronizing pulses.

Signal St on the second line is applied to input terminal 19 of gate 18.

The third line shows the pulse train at the output of the start/stop oscillator (1.8 GHz).

The fourth line represents the reset signals and lines 5 to 9 reproduce the signals in the dividing stages (not shown) of functional unit 13. The last line in FIG. 5 shows the shift-clock pulse train.

The dividing stages that are not shown in detail perform their respective dividing function in send mode as well as receive mode.

In send mode they are used to adjust the clock frequency at which data is output whereas in receive mode the dividing stages are selected or set so that they correspond to the clock frequency of the received data signal.

Functional unit 13 can also incorporate a measuring device in order to measure the pulse repetition frequency of incoming synchronizing bits with it also being possible, for example, to use the oscillator pulses from the start/stop oscillator. Depending on the measurement result obtained, the dividing stages can be automatically selected or their division ratio can be set in order to match the module to the repetition frequency of the incoming data sequence.

Because, in the case of the start/stop oscillator in FIG. 4, the printed circuit conductor can be calculated extremely precisely and, in practice, can also be dimensioned very precisely, the tolerances of this oscillator essentially depend only on the tolerances of the gate used.

It is also obvious that the high-speed serial/parallel and parallel/serial converter in FIG. 3 can be operated in both transmission directions and can also be equipped with all the necessary logic components, particularly a MUX/DEMUX, various control logic components, timing circuits etc. The converter in FIG. 3 can also be equipped with externally accessible control lines TxC1 and TxC2 in order to be able to set various clock frequencies or a different shift clock such as 1800 MHz, 900 MHz and 450 MHz with different or identical signals being applied to both the terminals TxC1 and TxC2 mentioned above in accordance with the Table below:

| Data transfer rate | Shift-clock frequency | TxC1 | TxC2 |
|---|---|---|---|
| 200 Mbytes/s | 1800 MHz | 1 | 1 |
| 100 Mbytes/s | 900 MHz | 0 | 1 |
| 50 Mbytes/s | 450 MHz | 1 | 0 |
| reserved | | 0 | 0 |

A further possibility of determining the data transfer rate from an incoming data stream involves sending a preamble before the data stream which contains all information for setting the division ratio of the dividing stages.

For a specialist, a series of alterations and modifications can be made simply without nevertheless going outside the scope of this invention. For instance, one of the standard buses mentioned can easily be combined with another, i.e. a VMEbus can be combined with a Futurebus with the idle lines in both systems being used as a high-speed serial bus. Other or several serial channels can also be straightforwardly used as a high-speed bus within a computer system within the sense of this invention. This invention is not confined to specific computer systems. The high-speed bus system according to this invention can also be successfully implemented in other equipment such as facsimile systems, high-capacity copiers etc.

The invention claimed is:

1. A method of operating a high-speed bus system in which at least one parallel bus and at least one serial bus are combined for simultaneous serial data transfer and parallel data and/or program transfer, by means of a logic circuitry operatively connected to said parallel bus, comprising the steps of:

setting up connection for said simultaneous serial data transfer and parallel data and/or program transfer by the use of the logic circuitry operatively connected to said parallel bus; and after setting up said connection, causing said simultaneous serial data transfer and parallel data and/or program transfer to take place.

2. The method according to claim 1, wherein at the start of the step of setting up the connection, a single data word is transmitted in accordance with an associated address via the serial bus for selecting a module and transferring a memory address, and thereafter an enabling signal is generated by the module to immediately enable the parallel bus so that, while serial data transfer is still taking place, the parallel bus is made ready for independent parallel data and/or program transfer.

3. The method according to claim 1, wherein, in the event of block transfer in accordance with a protocol exclusively via the serial bus, data are transferred over said at least one parallel bus during connection setup, said data containing the information necessary for serial data transfer such as start address and block length.

4. High-speed bus system comprising at least one parallel bus and at least one serial bus combined for simultaneous parallel data and/or program transfer and serial data transfer, with a logic circuitry being operatively connected to the parallel bus, said serial data transfer taking place after connection setup at the same time as said parallel data and/or program transfer is taking place on the parallel bus, and connection set up for both parallel data and/or program transfer and serial data transfer taking place using the logic circuitry of the parallel bus.

5. High-speed bus system according to claim 4, wherein said parallel bus comprises a standard VMEbus, a number of lines, at least one of those lines being not used for parallel transfer and said at least one not used line forms a high-speed serial bus.

6. High speed bus system according to claim 4, wherein a high-speed serial/parallel and parallel/serial converter(1) is inserted between a parallel bus (D0 . . . , D07) and a serial bus(2).

7. High-speed bus system according to claim 6, wherein the high-speed serial/parallel and parallel/serial converter(1) has two functional units(3,4), of which one functional unit (4) consists of a prescaler, a voltage-controlled oscillator (VCO) and a phase-lock loop(PLL) and the other functional unit(3) contains an internal control logic circuit which generates a busy signal(BUSY) when the serial bus(2) is occupied.

8. High-speed bus system according to claim 7, wherein received data from the other functional unit(3) is transferred as synchronizing data in order to synchronize the phase-locked loop(PLL) and the voltage controlled oscillator (VCO) in the other functional unit(4).

9. High-speed bus system according to claim 6, with several subscribers each equipped with a bus system, wherein each subscriber is equipped with a high-speed serial/parallel and parallel/serial converter where all subscribers can generate the busy signal and thereby detect whether or not they can actively initiate a connection setup.

10. High-speed bus system according to claim 6, where the high-speed serial/parallel and parallel/serial converter has two functional units(11,13) of which one functional unit(13) contains a nodelay response start/stop oscillator (FIG. 4) and the other functional unit(11) contains an internal control logic circuit(12) that generates a busy signal (BUSY) when the serial bus(20) is occupied.

11. High-speed bus system according to claim 10, wherein the start/stop oscillator(FIG. 4) has a controllable gate(18) and a delay line(17) having two terminals of which one terminal is connected to an output terminal of a gate(18) and of which the other terminal is connected to a first input terminal of gate(18) with gate(18) receiving a control signal on at least one second input terminal(19).

12. High-speed bus system according to claim 11, wherein the one input terminal of gate(18) connected to the other terminal of delay line(17) is a negating input terminal(19) and the at least one second input terminal is a non-inverting input terminal.

13. High-speed bus system according to claim 11, wherein a signal applied to the at least one second input terminal(19) of the gate(18) starts the start/stop oscillator(FIG. 4) and is derived from a synchronizing pulse that occurs once after each byte is transferred or is transmitted during serial or parallel data transfer.

14. High-speed bus system according to claim 13, further comprising a signal conditioning circuit that generates a control signal, from a single synchronizing pulse, the control signal starting with the leading edge of the synchronizing pulse and ending after a byte has been transferred.

15. High-speed bus system according to claim 11, wherein the delay line(17) is made as a stripline on a printed circuit board.

16. High-speed bus system according to claim 15, wherein the stripline on the printed circuit board is arranged in a looping pattern.

17. High-speed bus system according to claim 10, wherein the start/stop oscillator (FIG. 4) is designed so that it generates a pulse repetition frequency at least as high as one gigahertz.

18. High-speed bus system according to claim 17, wherein the pulse repetition frequency is 1.8 Ghz.

19. High-speed bus system according to claim 10 comprising a synchronizing pulse repetition frequency measuring device which measures pulse repetition frequency of a pair of synchronizing pulses with the help of oscillator pulses from the start/stop oscillator (FIG. 4) and automatically sets a shift-clock rate in response to said synchronizing pulse repetition frequency measuring device for controlling a shift register in the other functional unit.

20. High-speed bus system according to claim 19, wherein the synchronizing pulse repetition frequency measuring device has several controllable dividing stages for setting the shift-clock rate.

21. High-speed bus system according to claim 19, wherein a data sequence to be transferred is preceded by a preamble which contains information regarding a data transfer rate.

* * * * *